(12) United States Patent
Journath et al.

(10) Patent No.: US 11,932,426 B2
(45) Date of Patent: Mar. 19, 2024

(54) SEPARATION DEVICE FOR A SPACECRAFT

(71) Applicant: BEYOND GRAVITY SWEDEN AB, Gothenburg (SE)

(72) Inventors: Niklas Journath, Norrköping (SE); Magnus Thenander, Linköping (SE); Örjan Arulf, Linköping (SE); Johan Öhlin, Rimforsa (SE); Kjell Pettersson, Linköping (SE); Oskar Björfeldt, Linköping (SE)

(73) Assignee: BEYOND GRAVITY SWEDEN AB, Gothenburg (SE)

( * ) Notice: Subject to any disclaimer, the term of this patent is extended or adjusted under 35 U.S.C. 154(b) by 248 days.

(21) Appl. No.: 17/286,215

(22) PCT Filed: Oct. 19, 2018

(86) PCT No.: PCT/SE2018/051072
§ 371 (c)(1),
(2) Date: Apr. 16, 2021

(87) PCT Pub. No.: WO2020/080990
PCT Pub. Date: Apr. 23, 2020

(65) Prior Publication Data
US 2021/0339891 A1 Nov. 4, 2021

(51) Int. Cl.
*B64G 1/64* (2006.01)
(52) U.S. Cl.
CPC .................................. *B64G 1/645* (2013.01)
(58) Field of Classification Search
CPC ........ B64G 1/645; B64G 1/641; B64G 1/222; B64G 1/64; F16B 21/165; F16B 37/0864;
(Continued)

(56) References Cited

U.S. PATENT DOCUMENTS 3,204,515 A 9/1965 Dickie et al.
3,405,593 A * 10/1968 Kriesel ................. F16B 31/005
89/1.14
(Continued)

FOREIGN PATENT DOCUMENTS

CN 106494651 A 3/2017
CN 108298112 A 7/2018
(Continued)

OTHER PUBLICATIONS

Office Action dated Oct. 21, 2021 for European Patent Application No. 18937095.0, 6 pages.
(Continued)

*Primary Examiner* — Medhat Badawi
*Assistant Examiner* — Vicente Rodriguez
(74) *Attorney, Agent, or Firm* — Sage Patent Group

(57) ABSTRACT

A separation device for a spacecraft or launcher, separation device being movable from a locked state, in which the separation device is arranged to lock onto a component of a spacecraft or launcher, to a released state, in which component is released, separation device including: an inner housing divided into at least two portions for locking onto component of spacecraft or launcher, and a locking arrangement arranged to move between a locking configuration and a releasing configuration, wherein the locking configuration is such that said at least two portions of inner housing are prevented from separating, wherein said locking arrangement includes: a first part arranged to at least partially enclose said at least two portions of inner housing when locking arrangement is in the locking configuration.

11 Claims, 4 Drawing Sheets

(58) Field of Classification Search
CPC .... F16B 37/08; F16B 2200/63; F16B 31/005; F42B 3/006; F42B 15/36; Y10T 29/53839
See application file for complete search history.

(56) References Cited

U.S. PATENT DOCUMENTS

| | | | |
|---|---|---|---|
| 3,910,154 A | | 10/1975 | Gardner |
| 4,929,135 A | * | 5/1990 | Delarue ................. B64G 1/645 |
| | | | 102/378 |
| 5,123,794 A | * | 6/1992 | Pire ........................ B64G 1/645 |
| | | | 411/383 |
| 5,226,769 A | * | 7/1993 | Negre .................... F16B 21/073 |
| | | | 411/383 |
| 5,643,549 A | * | 7/1997 | Rhodes ................ A61K 51/088 |
| | | | 424/9.34 |
| 2001/0025564 A1 | | 10/2001 | Forys et al. |

FOREIGN PATENT DOCUMENTS

| | | |
|---|---|---|
| JP | H07-156900 A | 6/1995 |
| KR | 20120009568 A | 2/2012 |
| KR | 20180062889 A | 6/2018 |

OTHER PUBLICATIONS

European Search Report dated Sep. 29, 2021 for European Patent Application No. 18937095.0, 4 pages.
International Search Report and Written Opinion dated May 31, 2019 for International Patent Application No. PCT/SE2018/051072, 12 pages.

* cited by examiner

SEPARATION DEVICE FOR A SPACECRAFT

CROSS-REFERENCE TO RELATED APPLICATIONS

This application is a 35 U.S.C. § 371 national stage application for International Application No. PCT/SE2018/051072, entitled "A SEPARATION DEVICE FOR A SPACECRAFT", filed on Oct. 19, 2018, the disclosures and contents of which are hereby incorporated by reference in their entireties.

TECHNICAL FIELD

The present disclosure relates to a separation device for a payload in a launcher or spacecraft. The separation device comprises an inner housing and a locking arrangement arranged to move between a locking configuration and a releasing configuration. The inner housing is divided into at least two portions locked to each other by the locking arrangement when this is in the locking configuration. The separation device comprises an initiator which comprises means for providing high pressure fluid to an expansion chamber when the separation device is switched from a locked state to a released state. The high pressure fluid in the expansion chamber moves the locking arrangement from the locking configuration to the releasing configuration when the separation device is switched from the locked state to the released state.

BACKGROUND

Separation devices generate relatively high levels of shock when activated. This shock comes from different internal sources (depending on device design) such as initiator activation and bolt strain energy release. In classic separation nut designs, the main contributor to shock levels is the internal locking device impact when the locking device moves from the locking position to the releasing position. A payload such as a satellite is mounted onto a dispenser body which is launched by a launcher spacecraft into space. The payload is mounted to the dispenser body by separation devices arranged to release the payload at a certain point in time and space. It is crucial that the separation devices are separated exactly when intended to, since there will be no second chance in space to make a faulty separation successful. In order to safeguard proper release, the separation devices are equipped with powerful initiators. Furthermore, all parts of the spacecraft, e.g. the payload and the dispenser, are designed to have as low mass as possible. The material is therefore carefully chosen to allow as thin and lightweight constructions as possible, thus balancing on the edge of construction safety margins.

EP 2 848 538 relates to a different type of separation device than the present invention, and discloses a non-explosive tension release actuation device which includes an initiator system and a housing base attached to the initiator system. The device also includes a carriage assembly positioned at least partially within the housing base. The carriage assembly includes a carriage unit, a first jaw, a second jaw, a first rocker arm, and a second rocker arm. The first rocker arm and the second rocker arm are attached to the carriage unit and to the initiator system. The device further includes a load attachment unit positioned at least partially within the carriage unit and between the first jaw and the second jaw. The first jaw and the second jaw are configured to swing away from the load attachment unit in response to a downward motion of the carriage unit relative to the housing base.

The shock generated by traditional separation devices is problematic for the spacecraft, the dispenser and the attached electronic equipment due to the thin construction safety margins of these parts. This problem is usually greater for smaller spacecraft due to more restricted packing volume and shorter distance between shock source and equipment.

Thus, there is a need for an improved separation device.

SUMMARY

An object of the present disclosure is to provide a separation device for a payload in a spacecraft or launcher according to the appended claims where the previously mentioned problems are avoided. Another object is to provide a method according to the written description of the present application. This object is at least partly achieved by the features of the independent claims. The dependent claims contain further developments of the separation device.

According to at least one aspect of the present invention, a separation device for a spacecraft or launcher is provided, the separation device being movable from a locked state, in which the separation device is arranged to lock onto a component of a spacecraft or launcher, to a released state, in which said component is released, said separation device comprising:
  an inner housing divided into at least two portions for locking onto said component of said spacecraft or launcher,
  a locking arrangement arranged to move between a locking configuration and a releasing configuration, wherein the locking configuration is such that said at least two portions of said inner housing are prevented from separating, and
  at least one initiator comprising means for providing high pressure fluid to an expansion chamber when the separation device is moved from the locked state to the released state, wherein the high pressure fluid in said expansion chamber moves the locking arrangement from the locking configuration to the releasing configuration;
  wherein said locking arrangement comprises:
  a first part arranged to at least partially enclose said at least two portions of said inner housing when said locking arrangement is in the locking configuration,
  a piston arranged at least partially inside said expansion chamber, and
  at least one locking element which is held between said first part and said piston when said locking arrangement is in the locking configuration, thereby preventing said first part from releasing said at least two portions of said inner housing.

The separation device according to the present invention lowers the shock levels experienced by a component that is affixed to a spacecraft or a dispenser when said component is released therefrom. The separation device does this by providing a locking arrangement according to the present invention. The locking arrangement of the present invention allows for a lower separation force to be used when moving the separation device from a locked state to a released state, thus lowering the total amount of shock experienced by the system. For example, the initiator may be configured to provide a lower pressure fluid to the expansion chamber, or the piston may be of smaller diameter than what was previously possible using traditional separation devices. The component that the separation device is used for attaching to the spacecraft may for example be a satellite, a probe, or some other piece of equipment, or a fastener connected to any of the abovementioned pieces of equipment.

In the following, any reference to a longitudinal extension of said separation device or to radial directions thereof are to be interpreted as per their ordinary meaning. The separation device may for example be rotationally symmetric, in which case the longitudinal extension of said separation device coincides with the axis of symmetry and the radial directions are perpendicular to said longitudinal extension. Also, in the context of the present invention, the locked state may be understood as being the initial or base state of the separation device. The separation device is in the locked state until receiving a signal prompting it to move from the locked state to the released state. The separation device is thus movable from the locked state to the released state upon receiving a switch signal initiated by e.g. a user interacting with an interface or automated control of the separation device by a control unit.

According to at least one example embodiment, said inner housing is arranged to, when said locking arrangement is in a locking configuration, transfer a pretension of the component held by said inner housing through said first part and said at least one locking element, and into said piston. The inner housing may for example do this by having an abutment surface at the interface between itself and the first part. It should be understood that when the locking arrangement is in the locking configuration, said locking arrangement prevents said at least two portions of said inner housing from separating.

According to at least one example embodiment, said inner housing is arranged to transfer a radial load from a component attached to the separation device into the first part by means of respective abutment surfaces on said inner housing and said first part. Said radial load may for example originate from a pretensioning of the component-inner housing connection.

According to at least one example embodiment, said inner housing is divided into at least two portions of uniform shape and size. Having portions of uniform size and shape helps evenly distribute the load across the inner housing when the separation device is used to lock onto a pretensioned component of a spacecraft or launcher.

According to at least one example embodiment, said inner housing is divided into three portions. By having the inner housing divided into three portions, an even distribution of the load received from the component held by the inner housing is achieved. This is also achieved by having the inner housing be divided into at least three portions.

According to at least one example embodiment, said inner housing is divided into at least three portions.

According to at least one example embodiment, said separation device comprises a body. Said body may for example be a partially hollow case which is arranged to at least partially hold the components of the separation device. Said body may for example be arranged to hold said locking arrangement. Thus, the locking arrangement is protected from dirt, dust and debris, which may otherwise impact the performance of the separation device.

Additionally or alternatively, said first part of said locking arrangement may be referred to as an enclosing part or a locking sleeve. Said first part may for example be slidably arranged inside said body.

According to at least one example embodiment, the locking configuration is such that the at least two portions of said inner housing are prevented from separating by said first part.

According to at least one example embodiment, the at least one initiator comprises means for providing high pressure fluid to an expansion chamber when the separation device is moved from the locked state to the released state, wherein the high pressure fluid in said expansion chamber moves the piston of the locking arrangement, such that the locking arrangement moves from the locking configuration to the releasing configuration.

According to at least one example embodiment, the piston is movable between a blocking position and an unblocking position. The blocking position is such that the at least one locking element is held between the piston and the first part, i.e. such that the at least one locking element prevents the first part from moving to a position where it releases the at least two portions of said inner housing. The unblocking position is such that the at least one locking element is free to move away from the first part, thus allowing the first part to release the at least two portions of said inner housing.

According to at least one example embodiment, the high pressure fluid in said expansion chamber moves the piston of the locking arrangement from the blocking position to the unblocking position.

According to at least one example embodiment, the piston is slidably arranged inside the body. According to at least one example embodiment, the expansion chamber is at least partly defined by the piston and the body.

According to at least one example embodiment, the piston is arranged such that the high pressure fluid provided in said expansion chamber moves the piston in a first direction.

According to at least one example embodiment, the first direction is parallel with the longitudinal extension of the separation device.

According to at least one example embodiment, said locking arrangement is arranged such that when the high pressure fluid in said expansion chamber moves the piston of the locking arrangement from the blocking position to the unblocking position, said first part of said locking arrangement is free to move in a second direction.

According to at least one example embodiment, said first direction and said second direction are opposite each other. Thus, a force inverter is achieved in which the direction of the force from the fluid expanding in the expansion chamber is inverted between the piston and the first part. In at least one embodiment, the force exerted by the expanding fluid in the expansion chamber on the piston is opposite in direction to the direction in which the first part moves as the locking arrangement moves from the locking configuration to the releasing configuration. This helps in lowering the amount of shock experienced by the component as a result of the separation device moving from a locked state to a released state. Also, this helps in making the design more compact and eases manufacturing.

According to at least one example embodiment, said inner housing comprises at least one angled abutment surface arranged to abut at least one abutment surface on the first part when the locking arrangement is in the locking configuration.

According to at least one example embodiment, said angled abutment surface is angled relative to a longitudinal extension of said separation device.

According to at least one example embodiment, said angled abutment surface is provided at an angle between 5° and 85° relative to a longitudinal extension of said separation device, preferably between 10° and 55°, and most preferably between 15° and 25°. Having the angled abutment surface provided at an angle that is smaller than 90° relative to the longitudinal extension of the separation device allows the inner housing to redirect radial pretensioning forces from the component that is connected to the separation device into the first part.

According to at least one example embodiment, said first part comprises a second abutment surface arranged to abut a second abutment surface on the locking element.

According to at least one example embodiment, said second abutment surface is provided at an angle between 45° and 85° relative to a longitudinal extension of said separation device, preferably between 55° and 80°, and most preferably between 65° and 75°. Having the second abutment surface provided at an angle that is smaller than 90° relative to the longitudinal extension of the separation device allows the first part to redirect axial pretensioning forces from the inner housing into the locking element, which in turn is held in place by the piston when the locking arrangement is in the locking configuration.

According to at least one example embodiment, when said locking arrangement is in said locking configuration, said first part transmits said radial pretensioning forces from said inner housing into said at least one locking element. Consequently, said at least one locking element is held in place between said piston and said first part, until said piston is moved to an unblocking position, upon which the radial pretensioning forces transmitted to the at least one locking element causes it to move away from the first part, thus allowing the first part to release the inner housing. According to at least one example embodiment, aid at least one locking element is held in place between said piston, said first part and said housing of said separation device. According to at least one example embodiment, said abutment surface of said inner housing is a conical surface. According to at least one example embodiment, said abutment surface of said first part is a conical surface.

According to at least one example embodiment, said abutment surfaces are conical surfaces. Thereby, the pretensioning load of the inner housing and the component connected thereto is distributed evenly about the circumference of said first part.

According to at least one example embodiment, said inner housing comprises two abutment surfaces distanced from each other along a longitudinal extension of said separation device. Thus, better stability of the first part in relation to the inner housing is achieved.

According to at least one example embodiment, said at least one locking element is a cylindrical or spherical locking element. Having at least one locking element that is cylindrical or spherical allows for use of standardized components in the production of the separation device, thus reducing cost and complexity of the product.

According to at least one example embodiment, said at least one locking element is ball-shaped or spherical. Using spherical or ball-shaped locking element means that strong, cost-efficient and reliable components are used in the locking arrangement, thus reducing the total cost of the device.

According to at least one example embodiment, said at least one locking element is a wedge-shaped locking element. Having a wedge-shaped locking element is beneficial as this decreases the amount of contact surface stresses between the locking element and other components of the separation device.

According to at least one example embodiment, said piston comprises at least one protruding portion extending in a direction away from said expansion chamber, wherein said at least one locking element is held between said first part and said at least one protruding portion when said locking arrangement is in the locking configuration.

According to at least one example embodiment, said at least one protruding portion extends from said piston in a first direction.

According to at least one example embodiment, said at least one protruding portion is a skirt that extends from the piston.

According to at least one example embodiment, said at least one protruding portion is at least as many protruding teeth as there are locking elements in said locking arrangement. Thus, each locking element may be associated with a respective protruding tooth which, when said piston is in the blocking position, keeps the locking element in place.

According to at least one example embodiment, each one of said at least one protruding portion comprises at least one opening, each of which are arranged such that at least one of said at least one locking element may at least partially enter said opening. Said opening may for example be a window, through which a locking element may pass, or a space which is sized and dimensioned to at least partially hold a locking element. By having each one of the at least one protruding portion of the piston comprise at least one opening, the at least one locking element of the locking arrangement is allowed to move when the piston moves from the blocking position to the unblocking position. This allows for a secure connection of the locking element between the piston and the first part.

According to at least one example embodiment, the first part is arranged between the piston and the inner housing. Thus, there is no contact between the piston and the inner housing once the separation device is assembled. This is beneficial as shocks waves originating from the expansion chamber are forces to travel a more complicated path in order to reach the component that is connected to the separation device by means of the inner housing. The inner housing and the piston are separated from each other by the first part both when the locking arrangement is in the locking configuration and when it is in the releasing configuration.

According to at least one example embodiment, said inner housing comprises engaging means for engaging a component to said separation device. For example, the engaging means may be internal threads, ribs or recesses arranged to received ribs, or a locking protrusion or recess arranged to interlock with a component to said separation device. Thus, a secure and reliable connection between the separation device and a component that is to be secured thereto is achieved.

The invention also relates to a method using the devices described above with the steps of:
  initiating an initiator comprising means for providing high pressure fluid to an expansion chamber when the separation device is switched from a locked state to the released state,
  moving the locking arrangement from a locking configuration to a releasing configuration when the separation device is switched from a locked state to a released state by the high pressure fluid in the expansion chamber.

As described above, a number of embodiments of the locking arrangement are possible and allow for corresponding method steps for alternatingly allowing and permitting the separation of said at least two portions of said inner housing. The method relates to using the devices with the steps of:

moving the piston in a first direction by means of the high pressure fluid provided into said expansion chamber, wherein the first direction is parallel with the longitudinal extension of the separation device, and/or;

moving the piston of the locking arrangement from the blocking position to the unblocking position by means of the high pressure fluid provided into said expansion chamber, and/or;

moving said first part of said locking arrangement in a second direction that is opposite said first direction. Further details of the locking arrangement and the method of using the separation device have been disclosed above.

BRIEF DESCRIPTION OF DRAWINGS

The disclosure will be described in greater detail in the following, with reference to the attached drawings, in which.

DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1A:
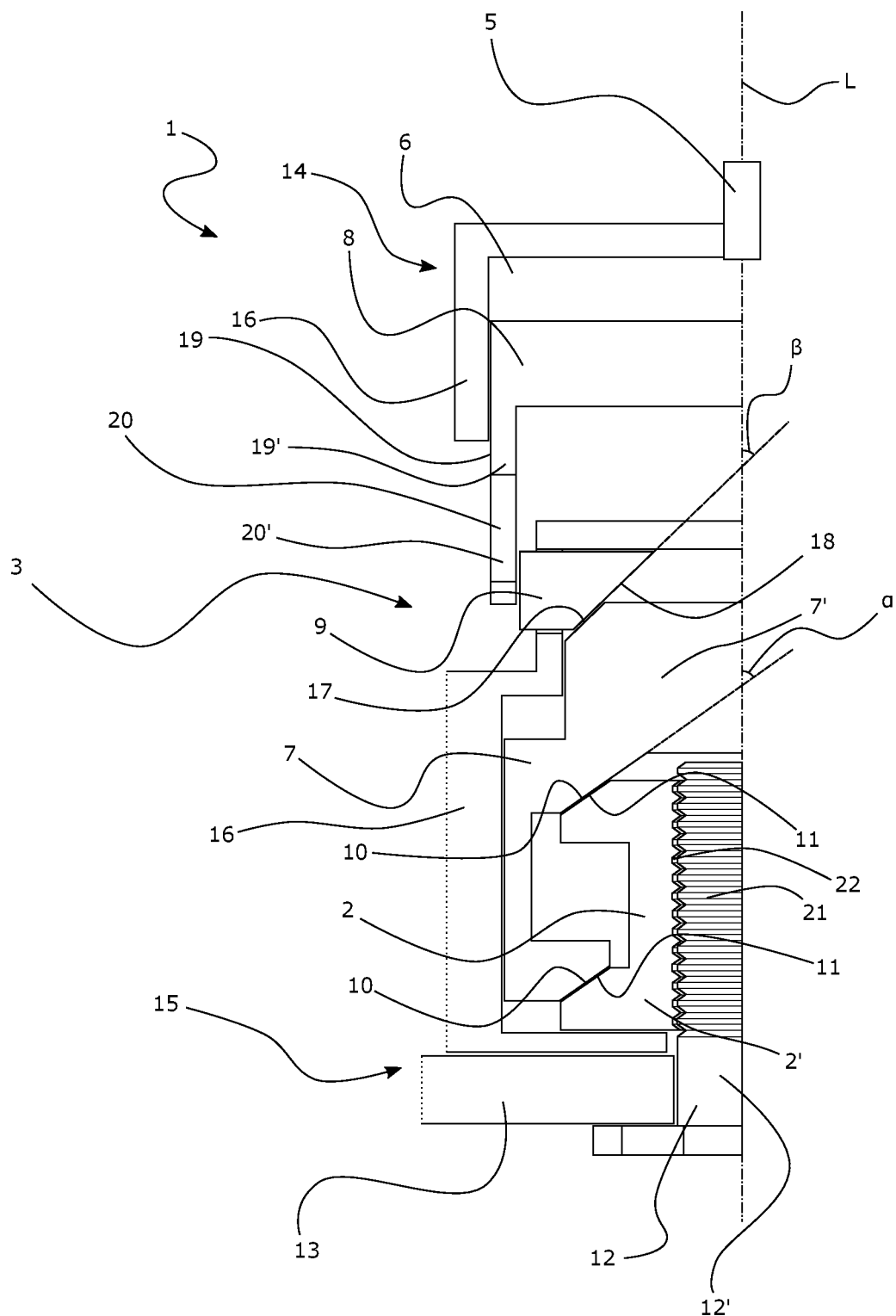
FIG. 1a schematically shows a cross-section of a separation device according to one aspect of the present invention, when the separation device is in the locked state and is locked onto a component of a spacecraft, FIG. 1b schematically shows a cross-section of the separation device of FIG. 1a, when the separation device is in the unlocked state and the locking arrangement is in the releasing configuration, just after the component has been released therefrom, FIG. 1c schematically shows a cross-section of the separation device of FIG. 1a, when the separation device is in the unlocked state and the locking arrangement is in the releasing configuration, FIG. 2a schematically shows a cross-section of a separation device according to one aspect of the present invention, when the separation device is in the locked state and is locked onto a component of a spacecraft, FIG. 2b schematically shows a cross-section of the separation device of FIG. 2a, when the separation device is in the unlocked state and the locking arrangement is in the releasing configuration, just after the component has been released therefrom, FIG. 2c schematically shows a cross-section of the separation device of FIG. 2a, when the separation device is in the unlocked state and the locking arrangement is in the releasing configuration.

FIG. 1a schematically shows a separation device 1 for use in attaching a payload 13 to a spacecraft or a launcher. The payload 13, for example a satellite, may be mounted onto the dispenser body by means of a number of separation devices 1 arranged to release the payload 13 at a certain point in time and space. The separation device 1 does this by being movable from a locked state, in which the separation device 1 is arranged to lock onto a component 12 of a spacecraft or launcher, to a released state, in which this component 12 is released.

The separation device 1 has a first end 14 and a second end 15, and a longitudinal axis L extending therethrough. The separation device 1 also comprises an inner housing 2 provided at the second end 15 of the separation device 1, wherein the inner housing 2 is divided into a number of portions 2', and is arranged to lock onto the component 12 that is to be locked to the separation device 1, when the portions 2' of the inner housing 2 are held together. The separation device 1 further comprises a locking arrangement 3 which is arranged to move between a locking configuration and a releasing configuration. The locking configuration is such that the portions 2' of the inner housing 2 are prevented from separating and the releasing configuration is such that the portions 2' of the inner housing 2 may be separated, thus releasing the separation device 1 from the component 12 to which it is locked onto.

The locking arrangement 3 comprises a piston 8, a plurality of wedge-shaped locking elements 9, and a first part 7, all of which are slidably arranged inside a body 16 of the separation device 1. The first part 7 is herein illustrated as a locking sleeve 7'. The body 16 of the separation device 1 is rigid and does not comprise any movable parts. The piston 8 is arranged at the first end 14 of the separation device 1, and defines an expansion chamber 6 together with a portion of the body 16 of the separation device 1. In connection with the expansion chamber 6, an initiator 5 for providing a high pressure fluid into the expansion chamber 6 is provided. The locking sleeve 7' is arranged at the second end 15 of the separation device 1. The locking elements 9 are arranged between the piston 8 and the locking sleeve 7' and are arranged to move radially outwards as the locking arrangement 3 moves from the locking configuration to the releasing configuration.

The locking configuration of the locking arrangement 3 is such that the locking sleeve 7' partially encloses the portions 2' of the inner housing 2 and prevents these from disengaging from each other by moving radially outwards. The locking sleeve 7' does this by having abutment surfaces 11 configured to abut corresponding abutment surfaces 10 on the inner housing 2. These abutment surfaces 10, 11 are angled at an angle α relative to a longitudinal axis L of the separation device 1, such that radial pretensioning forces resulting from the component 12 connected to the inner housing 2 are redirected into pretensioning forces having at least one axial component which is acting on the locking sleeve 7'. As the locking sleeve 7' at least partially encloses the portions 2' of the inner housing 2, the radial components of the pretensioning forces on the locking sleeve 7' cancel each other out, while the axial component is transferred into the locking elements 9 which prevents the locking sleeve 7' from sliding towards the first end 14 of the separation device 1. Thus, the locking elements 9 prevent axial movement of the locking sleeve 7' while the locking arrangement 3 is in the locking configuration, thus maintaining contact of the abutment surfaces 10, 11 of the locking sleeve 7' and the portions 2' of the inner housing 2. Furthermore, the locking sleeve 7 is provided with second abutment surfaces 17 configured to abut corresponding abutment surfaces 18 on the locking elements 9. The second abutment surfaces 17, 18 are angled at an angle β relative to a longitudinal axis L of the separation device 1, such that an axial pretensioning force from the locking sleeve 7' is transformed into a pretensioning force having at least one radial component acting on the locking elements 9. In the illustrated embodiment, the second abutment surface 17 of the locking sleeve 7' is a conical surface. The radial components of the pretensioning force acting on the locking elements 9 are then taken up by a protruding portion 19 of the piston 8. In the illustrated embodiment, the protruding portion 19 of the piston 8 is a skirt 19' which at least partially encloses the locking elements 9.

In the illustrated embodiment, the piston 8 partially encloses the locking sleeve 7' and the locking elements 9. However, the reverse arrangement is also possible, with the piston 8 being arranged at least partially inside the locking sleeve 7', and the locking elements 9 being arranged to move radially inwards as the locking arrangement 3 moves from the locking configuration to the releasing configuration.

Figure 1B:
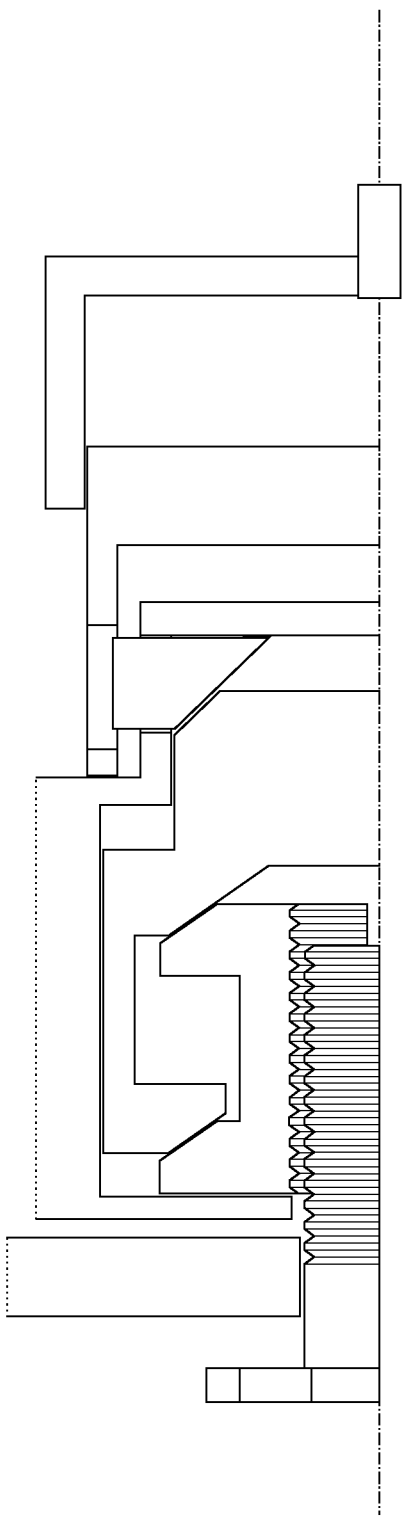
Figure 1C:
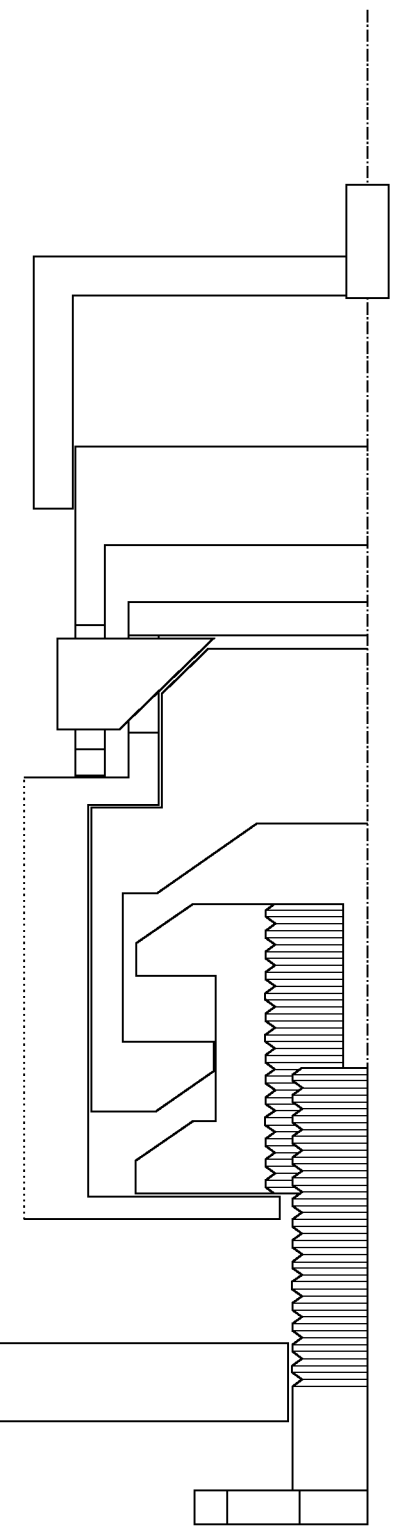

The piston 8 is movable between a blocking position (as illustrated in FIG. 1a), in which the locking elements 9 are held in place by the piston 8, the locking sleeve 7', and the body 16 of the separation device 1, thus preventing the locking sleeve 7' from moving away from the inner housing 2, and an unblocking position (as illustrated in FIGS. 1b-c). The unblocking position is such that the locking elements 9 are free to move radially outwards, thus allowing the locking sleeve 7' to move away from the inner housing 2. This, in turn, allows the portions 2' of the inner housing 2 to separate and release the component 12 to which the separation device 1 is locked.

In the locked state, the piston 8 is in the blocking position and the skirt 19' of the piston 8 prevents the locking elements 9 from moving radially outwards, thus keeping the locking sleeve 7' from moving towards the first end 14 of the separation device 1 and thereby releasing its grip on the portions 2' of the inner housing 2.

In the unlocked state, the initiator 5 provides a high-pressure fluid into the expansion chamber 6, which forces the piston 8 to move towards the second end 15 of the separation device 1, i.e. towards the unblocking position. The high-pressure fluid provided to the expansion chamber 6 moves the piston 8 in a first direction, which direction is parallel with the longitudinal axis L of the separation device 1. The skirt 19' of the piston 8 is provided with a number of openings 20, in the illustrated embodiment manifested as windows 20', which align with the locking elements 9 as the piston 8 moves to the unblocking position. Once aligned, the locking elements 9 are free to move radially outwards and enter the openings 20 on the skirt 19' of the piston 8, thus allowing the locking sleeve 7' to release its grip on the portions 2' of the inner housing 2 by moving in a second direction, which is parallel with the longitudinal axis L of the separation device 1 and opposite the first direction.

The control of the movement of the separation device 1 between the locked state and the released state is based on the separation device 1 receiving a switch signal. This switch signal may be initiated by a user providing remote control, by sensors signalling that certain parameters are at a predetermined value (e.g. position in space, time, etc.), thus allowing for automated control of the release.

In the illustrated embodiments, the component to which the separation device is locked onto is a bolt 12' used to secure e.g. a payload 13. The bolt 12' is provided with external threads 21 for engaging with internal threads 22 of the inner housing 2. However, it should be understood that the separation device 1 may alternatively be attached to other types of fasteners, or to other types of components.

FIG. 1b schematically shows a cross-section of the separation device 1 of FIG. 1a, when the separation device 1 is in the unlocked state and the locking arrangement 3 is in the releasing configuration, just after the bolt 12' has been released therefrom. Here, the piston 8 is in the unblocking position, having moved in the second direction so that the windows 20' provided on the skirt 19' align with the locking elements 9. This allows the locking elements 9 to move radially outwards as a result of the pretensioning force exerted on them by the locking sleeve 7'. As the locking element 9 moves radially outwards, the locking sleeve 7' moves in the first direction, thus releasing the grip on the portions 2' of the inner housing 2, which begin separating from each other. This causes the grip on the bolt 12' to which the separation device 1 was locked onto to release. For the sake of clarity, reference numerals relating to this aspect of the present invention have only been provided in relation to FIG. 1a.

FIG. 1c schematically shows a cross-section of the separation device 1 of FIG. 1a, when the separation device 1 is in the unlocked state and the locking arrangement 3 is in the releasing configuration. Here, the locking sleeve 7' has moved as far in the first direction as is possible until its movement is stopped by the body 16 of the separation device 1. The portions 2' of the inner housing 2 have also separated from each other as far as the separation device 1 allows, thus allowing the bolt 12' to freely detach from the separation device 1. For the sake of clarity, reference numerals relating to this aspect of the present invention have only been provided in relation to FIG. 1a.

Figure 2A:
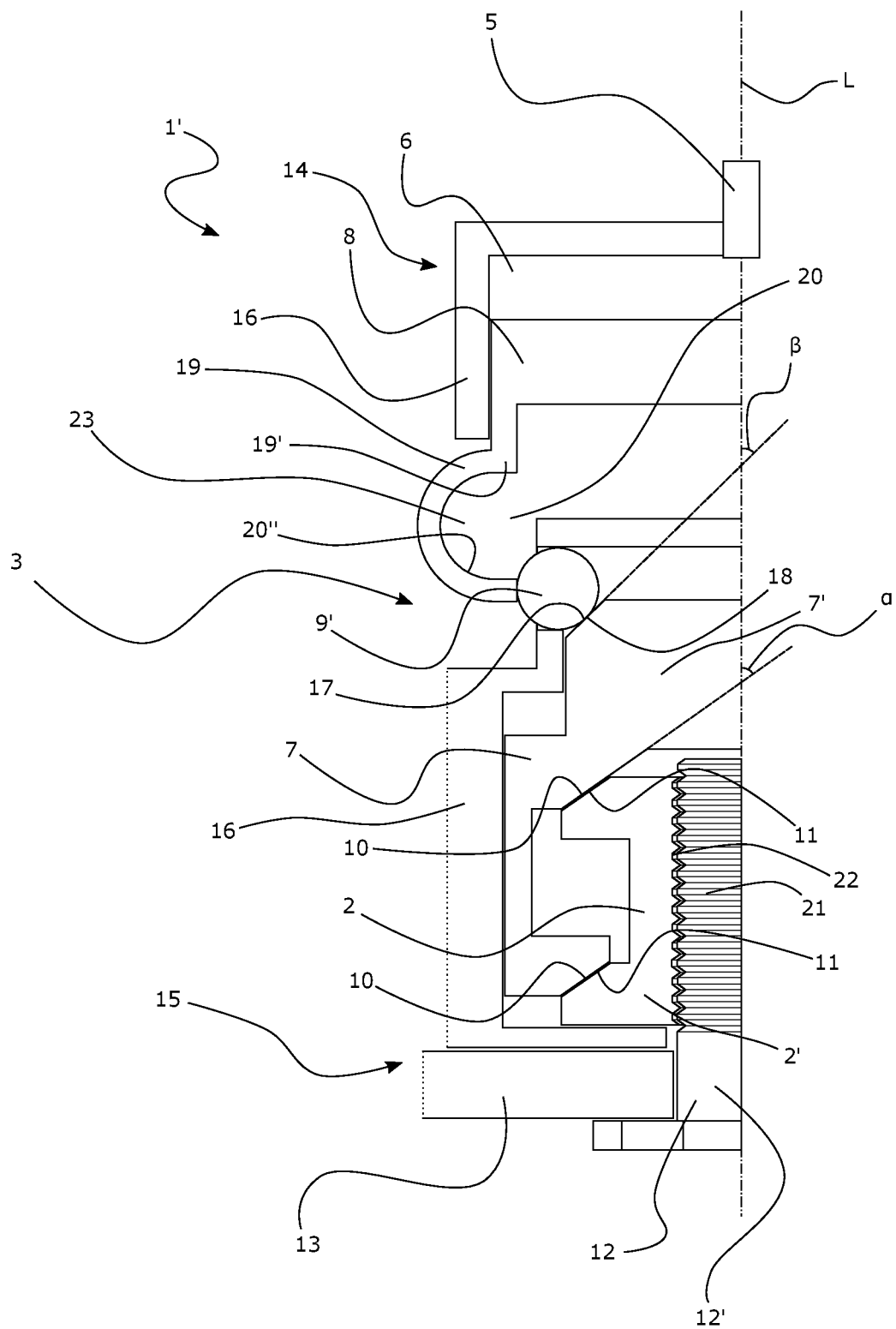
Figure 2B:
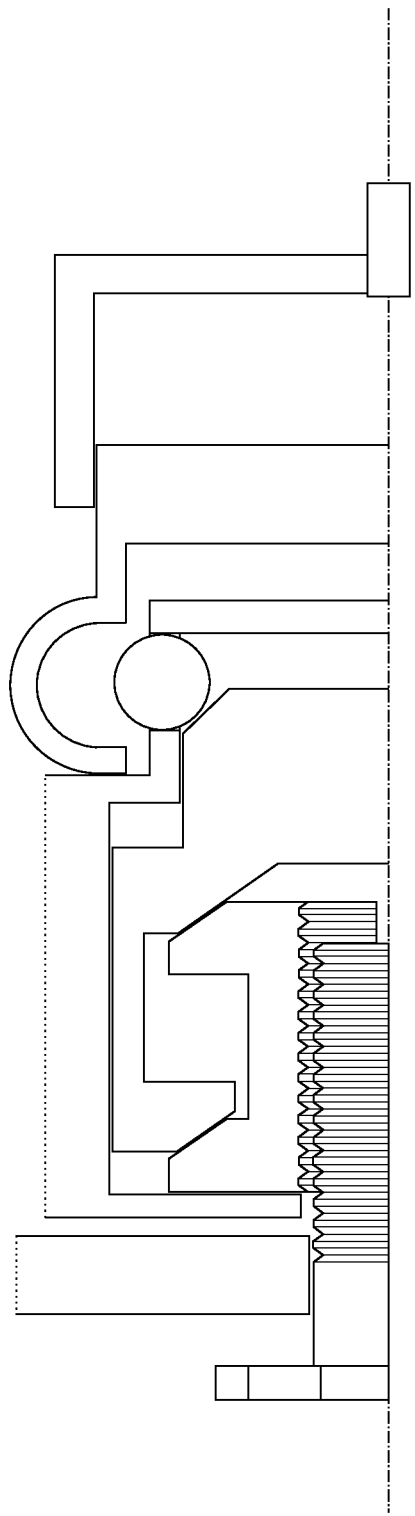
Figure 2C:
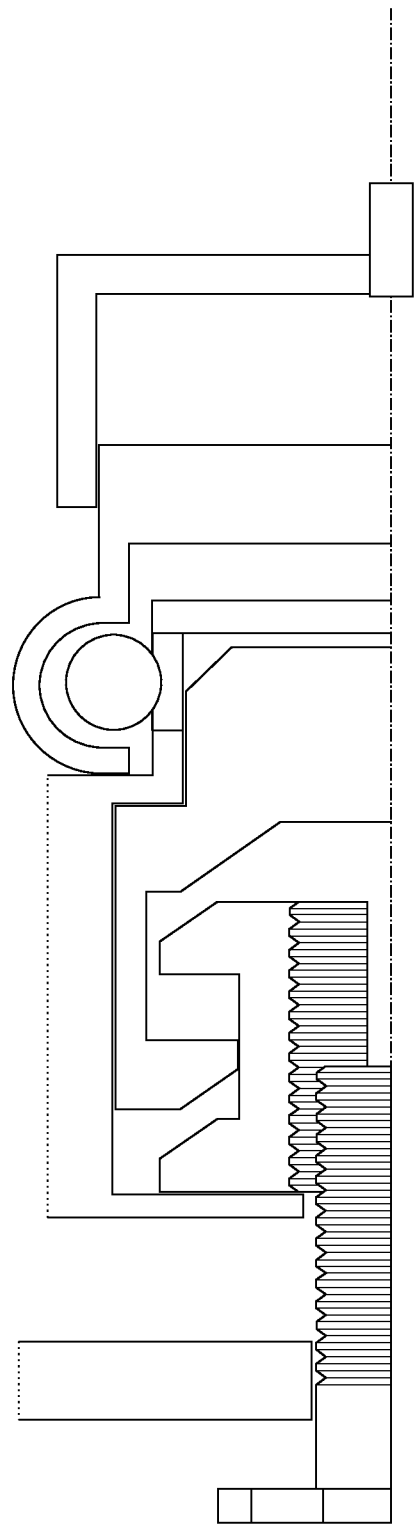

FIGS. 2a-c schematically show cross-sections of a separation device 1' according to one aspect of the present invention. The difference between the separation device 1' of FIGS. 2a-c and that of FIGS. 1a-c is that the locking elements 9' in this aspect of the invention are ball-shaped, and that the opening 20 in the protruding portion 19 of the piston 8 is defined by an inner wall 20'' of the protruding portion 19 that curves radially outwards, thus forming a pocket 23 in which the locking elements 9' may be at least partially received. For the sake of clarity, reference numerals relating to this aspect of the present invention have only been provided in relation to FIG. 2a.

It will be appreciated that the above description is merely exemplary in nature and is not intended to limit the present disclosure, its application or uses. It should be understood that features and details from one aspect of the invention are also applicable to other aspects of the invention.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

The invention claimed is:

1. A separation device for a spacecraft or launcher, the separation device being movable from a locked state, in which the separation device is arranged to lock onto a component of said spacecraft or launcher, to a released state, in which said component is released, said separation device comprising:

an inner housing divided into at least two portions for locking onto said component of said spacecraft or launcher, a locking arrangement arranged to move between a locking configuration and a releasing configuration, wherein the locking configuration is such that said at least two portions of said inner housing are prevented from separating, and at least one initiator that provides high pressure fluid to an expansion chamber when the separation device is moved from the locked state to the released state, wherein the high pressure fluid in said expansion chamber moves the locking arrangement from the locking configuration to the releasing configuration;

wherein said locking arrangement comprises:

a first part arranged to at least partially enclose said at least two portions of said inner housing when said locking arrangement is in the locking configuration, wherein said inner housing comprises at least one angled abutment surface arranged to abut at least one abutment surface on the first part when the locking arrangement is in the locking configuration, a piston arranged at least partially inside said expansion chamber, and at least one locking element which is held between said first part and said piston when said locking arrangement is in the locking configuration, thereby preventing said first part from releasing said at least two portions of said inner housing.

2. The separation device according to claim 1, wherein the piston is arranged such that the high pressure fluid provided in said expansion chamber moves the piston in a first direction, wherein the first direction is parallel with a longitudinal extension of the separation device.

3. The separation device according to claim 2, wherein said locking arrangement is arranged such that when the high pressure fluid in said expansion chamber moves the piston of the locking arrangement from a blocking position to an unblocking position, said first part of said locking arrangement is free to move in a second direction.

4. The separation device according to claim 3, wherein said first direction and said second direction are opposite to each other.

5. The separation device according to claim 1, wherein said abutment surfaces are conical surfaces.

6. The separation device according to claim 1, wherein said at least one locking element is ball-shaped or spherical.

7. The separation device according to claim 1, wherein said piston comprises at least one protruding portion extending in a direction away from said expansion chamber, and wherein said at least one locking element is held between said first part and said at least one protruding portion when said locking arrangement is in the locking configuration.

8. The separation device according to claim 7, wherein said at least one locking element is held between said first part, said at least one protruding portion, and a body of said separation device when said locking arrangement is in the locking configuration.

9. The separation device according to claim 7, wherein each one of said at least one protruding portion comprises at least one opening, each of which is arranged such that at least one of said at least one locking element may at least partially enter said opening.

10. The separation device according to claim 1, wherein the first part is arranged between the piston and the inner housing.

11. The separation device according to claim 1, wherein said inner housing comprises engaging material for engaging said component to said separation device.

* * * * *